United States Patent [19]
Baker

[11] Patent Number: 5,822,091
[45] Date of Patent: *Oct. 13, 1998

[54] EXTREME DEPTH-OF-FIELD OPTICAL LENS AND HOLOGRAPHIC PROJECTOR SYSTEM FOR ITS PRODUCTION

[76] Inventor: Kenneth M. Baker, 1365 Victory Blvd., Van Nuys, Calif. 91401

[*] Notice: The term of this patent shall not extend beyond the expiration date of Pat. No. 5,642,209.

[21] Appl. No.: 591,888

[22] Filed: Jan. 25, 1996

Related U.S. Application Data

[63] Continuation-in-part of Ser. No. 381,204, Jan. 31, 1995, Pat. No. 5,642,209, which is a continuation-in-part of Ser. No. 20,668, Feb. 22, 1993, abandoned.

[51] Int. Cl.$^6$ ................................................. G03H 1/10
[52] U.S. Cl. ........................... 359/10; 359/15; 359/569; 359/577
[58] Field of Search .................................. 359/8, 10, 15, 359/20, 28, 35, 566, 569, 574, 575, 577, 900

[56] References Cited

U.S. PATENT DOCUMENTS

| | | | |
|---|---|---|---|
| 3,120,437 | 2/1964 | Lindquist | 430/152 |
| 3,203,803 | 8/1965 | Habib et al. | 430/186 |
| 3,635,545 | 1/1972 | Vankerkhove et al. | 359/569 |
| 3,883,232 | 5/1975 | Tsunoda | 359/577 |
| 3,917,380 | 11/1975 | Kato et al. | 359/35 |
| 4,403,028 | 9/1983 | Mustacchi et al. | 430/178 |
| 4,421,398 | 12/1983 | Suzuki et al. | 396/150 |
| 4,469,407 | 9/1984 | Cowan et al. | 359/566 |
| 4,496,216 | 1/1985 | Cowan | 359/566 |
| 4,802,719 | 2/1989 | Magarinos et al. | 359/15 |
| 4,880,667 | 11/1989 | Welch | 427/160 |
| 4,998,787 | 3/1991 | Caputi et al. | 359/22 |
| 5,124,843 | 6/1992 | Leger et al. | 359/569 |
| 5,455,691 | 10/1995 | Kuwayama et al. | 359/15 |

FOREIGN PATENT DOCUMENTS

| | | | |
|---|---|---|---|
| 2952607 | 12/1979 | Germany. | |
| 61-172856 | 4/1986 | Japan | C07C 113/04 |
| 68097 | 8/1973 | Poland | C07D 87/38 |

OTHER PUBLICATIONS

M.M. Burns, et al., "Optical Matter: Crystallization and Binding in Intense Optical Fields", *Science*, vol. 249, 17 Aug. 1990, pp. 749–754.

P.W. Rhodes, et al., "Refractive optical Systems for Irradiance Redistribution of Collimated Radiation: Their Design and Analysis", *Applied Optics*, vol. 19, No. 20, pp. 3545–3553, Oct. 15, 1980.

(List continued on next page.)

*Primary Examiner*—Paul M. Dzierzynski
*Assistant Examiner*—John Juba, Jr.
*Attorney, Agent, or Firm*—Kelly Bauersfeld Lowry & Kelley, LLP.

[57] ABSTRACT

A modulated index lens containing a subsurface zeroth order coherent microlenticular mosaic defined by an index gradient adds a normalizing function to the vergences or parallactic angles of incoming light rays subtended from field object points and redirects them, in the case of near-field images, to that of far-field images. Along with a scalar reduction of the lense's linear focal range, this results in an extreme depth of field with a narrow depth of focus and when used as an intraocular lens (IOL) or contact lens avoids the focal split-up, halo, and inherent reduction in contrast of multifocal IOLs and multifocal contact lenses. A high microlenticular spatial frequency, which, while still retaining an anisotropic medium, results in a nearly total zeroth order propagation throughout the visible spectrum. The curved lens surfaces still provide most of the refractive power of the lens, and the unique holographic fabrication technology is especially suitable for contact lenses, artificial corneas, and miniature lens elements for cameras and other optical devices. The holographic projector system has many other uses such as for the fabrication of directional light filters, microlens arrays, and highly corrected submicron patterning on curved surfaces.

30 Claims, 15 Drawing Sheets

OTHER PUBLICATIONS

H. Dammann, et al., "High–Efficiency In–Line Multiple Imaging By Means of Multiple Phase Holograms", *Optics Communications*, vol. 3, No. 5, Jul. 1971.

SPIE vol. 523 Applications of Holography (1985) pp. 251–259 (Cowan).

Applied Optics Mar. 1, 1981/Vo. 20, No. 5, pp. 897–909, (Burkhard et al).

SMI Form 1021, Apr. 1987—Technical Report MMT A3 1134.

129/SPIE vol. 503 Application, Theory & Fabrication of Periodic Structures (1984)—James Cowan.

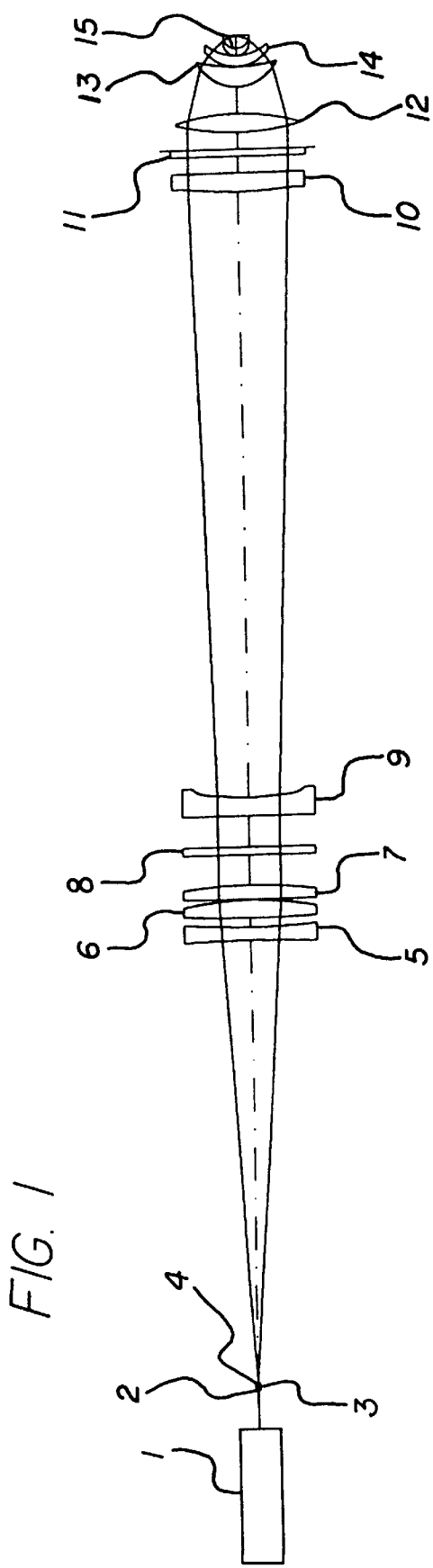
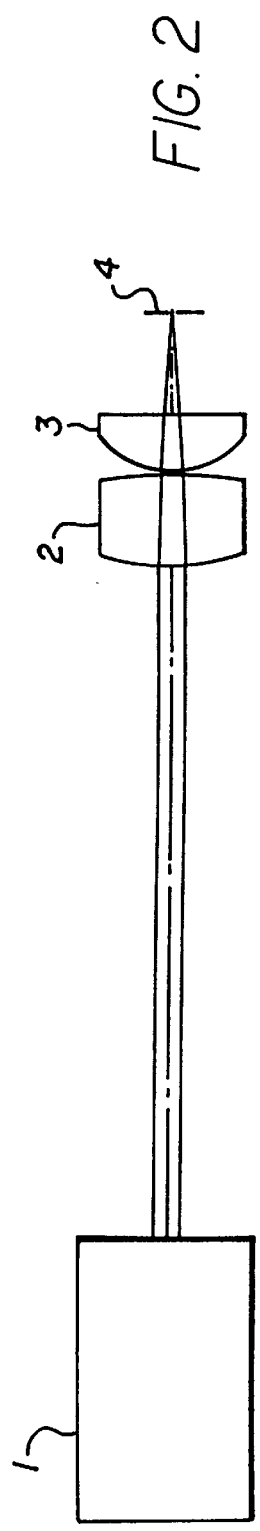
FIG. 1
FIG. 2

FIG. 4A

| 1 | 0 | 1 | 0 | 1 | 0 | 1 | 0 |
|---|---|---|---|---|---|---|---|
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |
| 0 | 1 | 0 | 1 | 0 | 1 | 0 | 1 |

FIG. 4B

| 1 | 2 | 1 | 2 | 1 | 2 | 1 | 2 |
|---|---|---|---|---|---|---|---|
| 0 | 3 | 0 | 3 | 0 | 3 | 0 | 3 |
| 1 | 2 | 1 | 2 | 1 | 2 | 1 | 2 |
| 0 | 3 | 0 | 3 | 0 | 3 | 0 | 3 |
| 1 | 2 | 1 | 2 | 1 | 2 | 1 | 2 |
| 0 | 3 | 0 | 3 | 0 | 3 | 0 | 3 |
| 1 | 2 | 1 | 2 | 1 | 2 | 1 | 2 |
| 0 | 3 | 0 | 3 | 0 | 3 | 0 | 3 |

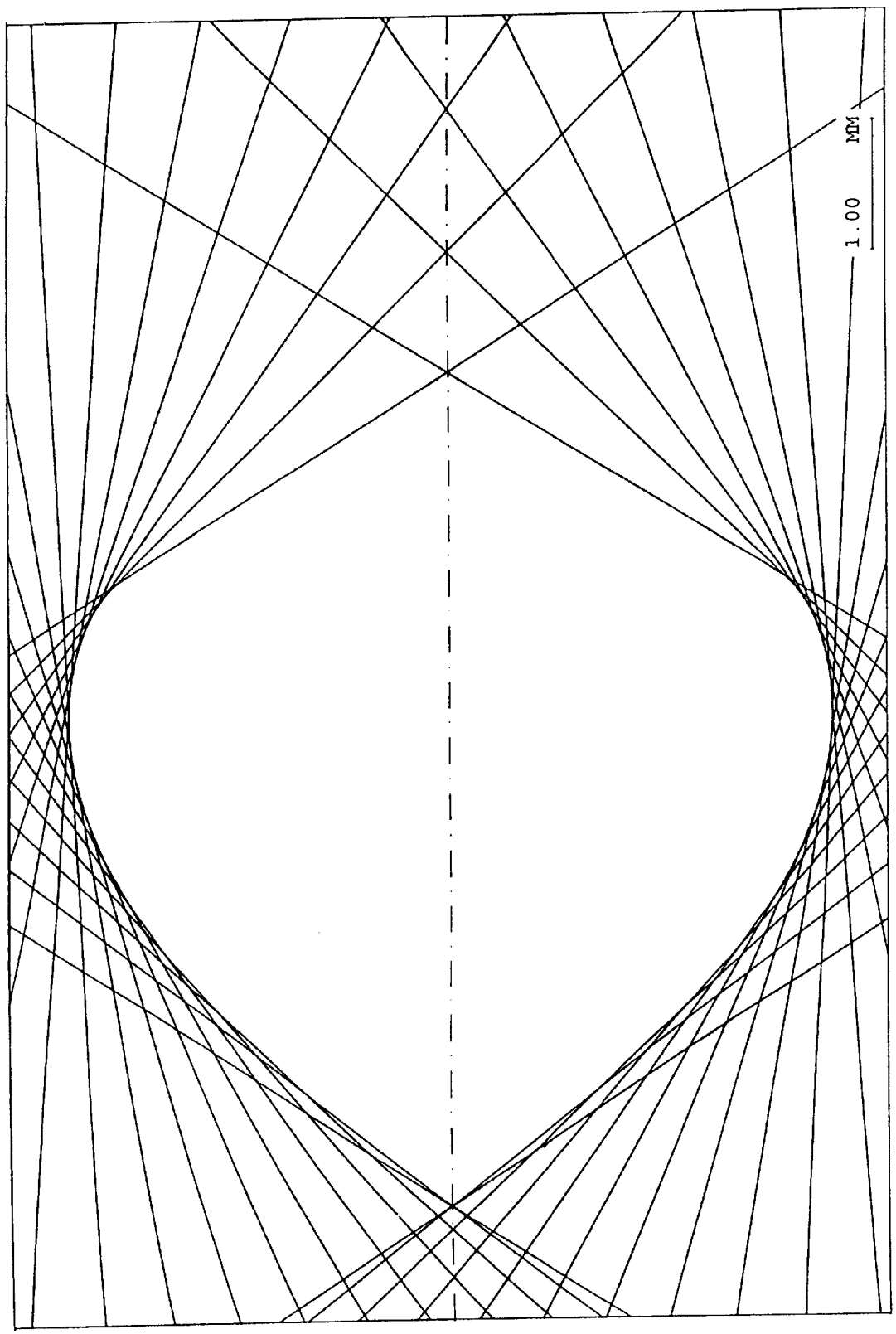

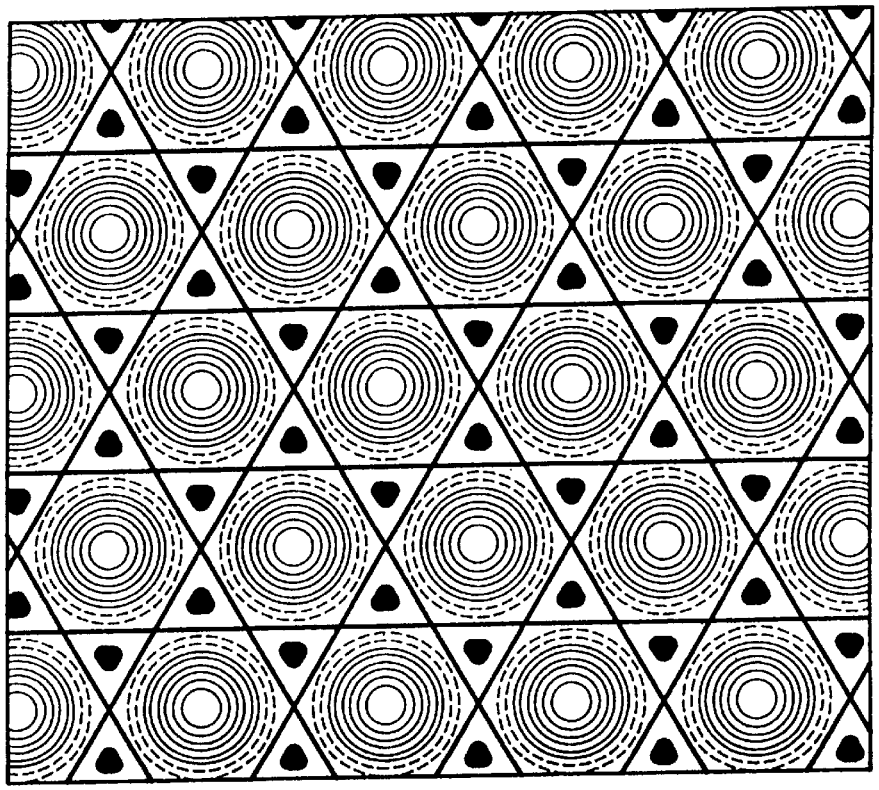
FIG. 8A
FIG. 9A
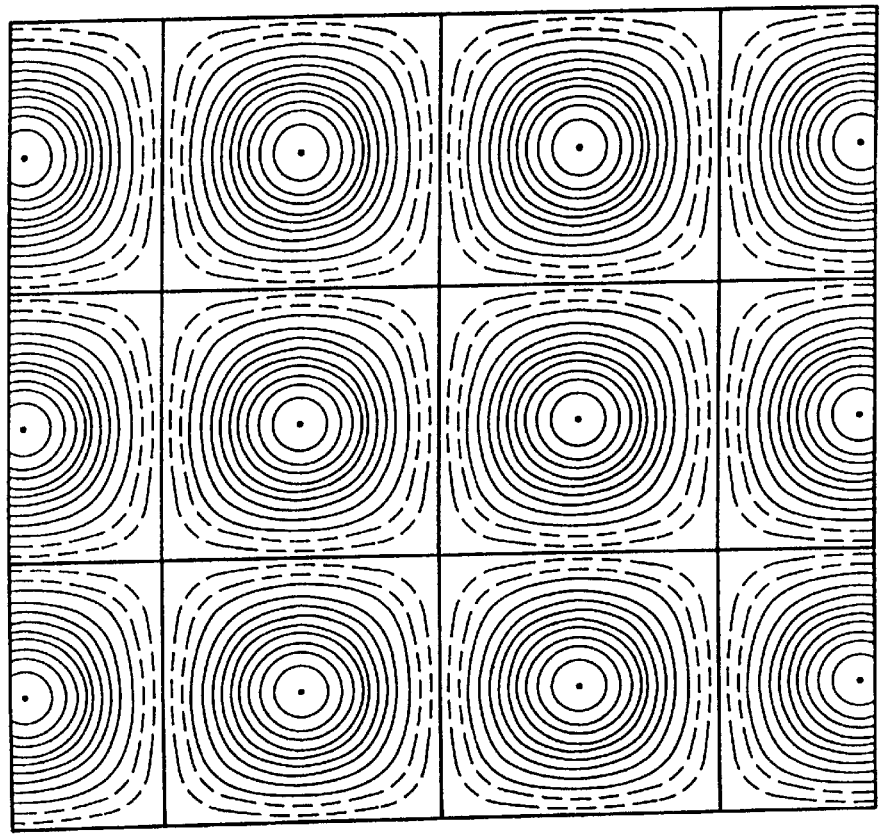

EXTREME DEPTH-OF-FIELD OPTICAL LENS AND HOLOGRAPHIC PROJECTOR SYSTEM FOR ITS PRODUCTION

This is a continuation-in-part of DIRECTIONAL LIGHT FILTER AND HOLOGRAPHIC PROJECTOR SYSTEM FOR ITS PRODUCTION, Ser. No. 08/381,204, filed Jan. 31, 1995, now U.S. Pat. No. 5,642,209, as a continuation-in-part of prior Ser. No. 08/020,668, filed Feb. 22, 1993, and later abandoned.

BACKGROUND OF THE INVENTION

This invention relates generally to an improved optical lens or the like, and its related method of production and system components used in connection therewith, to provide an extreme depth-of-field for the eye or other optical systems. Especially suitable applications include the use of the holographic projector system to fabricate intraocular lenses (IOLs), contact lenses, artificial corneas, and miniature lens elements for cameras and other optical devices. A particularly useful application is that of lens elements for video surveillance cameras.

The holographic projector system also provides a means of fabricating directional light filters with a much finer patterning than that described previously and also highly corrected mesh patterning and close-packed microlenslet arrays with sub-micron periodicity which can be made on selected curved surfaces.

Between 1949, when the first IOL was surgically implanted, and late 1987, essentially all implanted IOLs were distance-focused, single-vision refractive lenses. The resultant pseudophakia thereafter required the patients to typically wear reading spectacles to obtain functional near vision. Subsequently, in a quest for pseudoaccommodation, diffractive bifocal IOLs were introduced which increased the depth of field at a design-related expense in image quality. These lenses are generally known as multifocal IOLs because even though the bifocal feature provides distance and near images, the wide depth of field also includes the intermediate vision between the distance and the near. Each multifocal IOL consists of a refractive lens which has a blazed phase zone plate (also known as a Fresnel zone plate or an asymmetrical kinoform) superimposed on either its anterior or posterior surface. Unlike two-zone refractive bifocal IOLs, they are generally less sensitive to pupil size and lens displacement.

However, the retinal image of multifocal IOLs is subject to a diffuse halo and well over a 50% reduction in contrast due to the out-of-focus component, including considerable losses from second and higher order diffractions (19% at the design wavelength of 555 nm). This substantially degrades the modulation transfer function (MTF) which measures the efficiency of contrast transfer from the object to the image that would be associated with the in-focus component alone.

Similar problems have been encountered with diffractive multifocal contact lenses. Many types of refractive multifocal contact lenses have also become available, including a type which has alternating refractive strips for near and distant vision, but all of them in some way split up the retinal image.

The hyperfocal distance of the emmetropic or average normal eye is the object distance at which the eye focuses so that its far depth of field just extends to infinity and is roughly equal to 1000 times the pupil aperture diameter. The eye's near limit of this depth of field is then half the hyperfocal distance. In a nominal case at any particular focal distance, the depth of field of the eye is about ±¼ diopter (D), which includes the distances on either side of the point of best focus. Therefore, the depth of field or range of distance over which vision is perfectly clear when the eye is focused at 0.5 meter (2D) is approximately 12.5 cm; when the eye is focused at 0.25 meter (4D), the distance is only approximately 3.125 cm. Note that because of this changing proportionality, the depth of field toward the eye from the point of best focus is smaller than that away from the eye.

Generations of lens designers have sought to use negative or uncorrected spherical aberration to increase the depth of field of a lens system but have met with little success. The concept was to allow rays from a point on the optical axis passing through the outer lens zones to focus closer to the lens than the rays passing through the central zones. Thus the outer zone near field focus could be brought within the far field paraxial focal range which has a high depth of focus. Problematically, this shifts the outer zone far field focus even closer to the lens and out of the near field paraxial focal range. The broad near field linear focal range is due to much larger vergences or parallactic angles subtended from object points in the near field than those subtended from object points in the far field.

The attempts at increasing the depth of field by the use of spherical aberration relied upon a singular system of concentrically correcting the rays of the outer lens zones towards the axial zones. However, a more comprehensive system of correction which has not been available in conventional refractive lens design is necessary. This involves the same kind of concentric correction but implemented at all points transverse to any given wavefront passing through the lens. The technique is limited to a relatively small lens size in relation to the near object focal distance because of what may be termed parallactic aberration, which is akin to the aberrations arising from the non-coincidence of features when multiple stereoscopic images are superimposed. However, with the modulated index lens of the present invention, the near field and far field focuses are never superimposed but fall in normal fashion at different points along the linear focal range. The linear focal range is compressed to a much shorter range than that of a conventional refractive lens. In terms of a three-dimensional ray trace format of the angular ray components of the wavefront, it is as though the format has been stretched in the direction of propagation of the wavefront, collapsing the size of the ray angles. In this case the wavefront is spherical and is converging.

SUMMARY OF THE INVENTION

Binary optical generated standing wave interference patterns are projected within a thin film coating of an index modulation photopolymer deposited onto the curved surface of a refractive lens. After a development process, the thin film will contain a monolithic close-packed zeroth order coherent microlenticular mosaic defined by an index gradient within the thin film. This microlenticular modulated index patterning derives from a diverging lattice of either hexagonal or square rod-like intensity maxima extending outward from a compact holographic projector. The resultant modulated index lens has an extreme depth of field and, unlike multifocal IOLs or multifocal contact lenses, does not split the light between separate components comprising the near field focus and the far field focus. Instead, the modulated index lens is a zeroth order lens which utilizes a system that moves the linear near field focal range back to within the far field focal range. The depth of focus ranges for both the near field and the far field then overlap and an in-between optimal focal point may then be selected.

The holographic projector offers a marked improvement over past technology in that a much smaller and highly corrected patterning on and within selected curved surfaces has now been achieved.

These and other advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic representation of a preferred embodiment of the holographic projector system of the present invention;

FIG. 2 is an enlarged schematic representation of the two-element input objective, including pinhole spatial filter, of the beam expander-collimator section of the holographic projector system;

FIG. 4a is a construction diagram of a two phase-level holographic diffraction grating used in another design of the holographic projector according to the present invention;

FIG. 4b is a construction diagram of a four phase-level holographic diffraction grating also used in another design of the holographic projector according to the present invention;

FIG. 6c is an enlarged schematic ray trace representation of a caustic formed by input beams at ±4.0 degrees;

FIG. 8a is a two-dimensional computer plot of the equiangular three-beam standing wave interference intensity pattern;

FIG. 8b is a three-dimensional computer generated inverted isometric view of the intensity pattern of FIG. 8a;

FIG. 9a is a two-dimensional computer plot of the equiangular four-beam standing wave interference intensity pattern;

FIG. 9b is a three-dimensional computer generated inverted isometric view of the intensity pattern of FIG. 9a;

FIG. 10 is a three-dimensional computer generated non-inverted isometric view of the equiangular three-beam intensity pattern of FIG. 8a;

DETAILED DESCRIPTION OF THE INVENTION

Figure 3A:
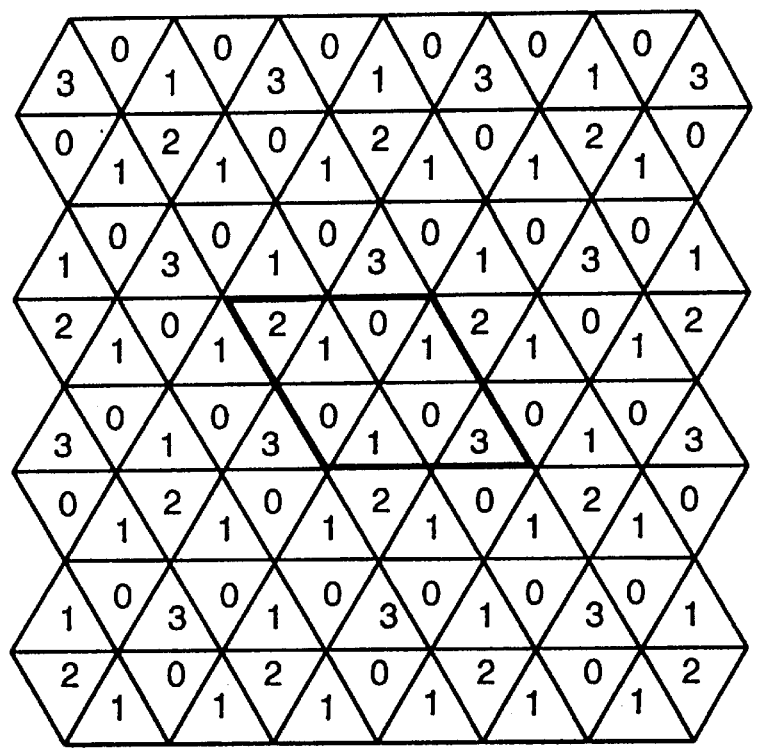
FIG. 3a is a construction diagram of a four phase-level holographic diffraction grating used in one design of the holographic projector system according to the present invention.

The holographic projector system of the present invention utilizes an optics system such as that embodied in FIG. 1. A Coherent Enterprise Model 652 UV Argon ion (Ar) laser was selected for this work. This model is unpolarized in that it lacks Brewster windows, having only a high reflector at one end of the plasma tube and an output coupler at the other end. The laser at 1 emits a beam which, although first may be put through a timer-actuated mechanical shutter (not shown), is directed into a two-element input objective at 2 and 3 followed by a pinhole spatial filter at 4. A close-up schematic of these elements is shown in FIG. 2. The expanded beam then passes through lens elements 5, 6, and 7 for recollimation. The beam expander-collimator (see Table 1) is an exact scale-up of a Newport/Klinger Tropel UV Model T27-100-150 except for the T27-6 two-element input objective at 2 and 3 which is available from Newport/Klinger Corporation of Irvine, Calif.

TABLE 1

Lens Data
ILLUMINATOR SECTION END-TO-END, SCALED TO 150 MM OUT

| ELEMENT NO. | >OBJ: | RDY INFINITY | THI INFINITY | GLA | |
|---|---|---|---|---|---|
| | STO: | INFINITY | 25.400000 | | |
| 2 | 2: | 7.50000 | 3.220000 | SILICA_SPECIAL | ⎫ |
| | 3: | −26.30000 | 0.130000 | | ⎬ T27-6 |
| 3 | 4: | 3.25000 | 1.910000 | SILICA_SPECIAL | ⎭ |
| | 5: | 7.50000 | 3.544150 | | |
| | 6: | INFINITY | 673.663705 | | |
| 5 | 7: | −2086.30721 | 20.662448 | SILICA_SPECIAL | |
| | 8: | 1139.62211 | 14.062464 | | |
| 6 | 9: | 1622.30214 | 28.124929 | SILICA_SPECIAL | |
| | 10: | −490.03001 | 1.874995 | | |
| 7 | 11: | INFINITY | 22.237444 | SILICA_SPECIAL | |
| | 12: | −674.97954 | 0.000000 | | |
| | 13: | INFINITY | 47.624879 | | |
| 8 | 14: | INFINITY | 12.700000 | BK7_SCHOTT | ⎫ |
| | 15: | INFINITY | 47.624879 | | ⎬ BANDPASS FILTER |

TABLE 1-continued

Lens Data
ILLUMINATOR SECTION END-TO-END, SCALED TO 150 MM OUT

| ELEMENT NO. | >OBJ: | RDY INFINITY | THI INFINITY | GLA | | |
|---|---|---|---|---|---|---|
| 9 | 16: | INFINITY | 28.124929 | CAFL_SPECIAL | | |
| | 17: | 937.497625 | 937.497625 | | | |
| | ASP: | | | | | |
| | K: | −0.788480 | KC: 100 | | | |
| | IC: | YES | CUF: 0.000000 | CCF: 100 | | |
| | A: | −.700502E-06 | B: 0.864616E-10 | C: 0.000000E + 00 | D: 0.000000E + 00 | |
| | AC: | 100 | BC: 100 | CC: 100 | DC: 100 | |
| 10 | 18: | 625.40251 | 28.124929 | CAFL_SPECIAL | | |
| | ASP: | | | | | |
| | K: | −0.734690 | KC: 100 | | | |
| | IC: | YES | CUF: 0.000000 | CCF: 100 | | |
| | A: | 0.682884E-08 | B: −.353346E-11 | C: 0.000000E + 00 | D: 0.000000E + 00 | |
| | AC: | 100 | BC: 100 | CC: 100 | DC: 100 | |
| | 19: | INFINITY | 25.400000 | | | |
| | IMG: | INFINITY | 0.000000 | | | |
| SPECIFICATION DATA | | REFRACTIVE INDICES | | APERTURE DATA | | |
| EPD | 0.76676 | GLASS CODE | | 363.789 NM | CA | |
| DIM | MM | SILICA SPECIAL | | 1.474724 | CIR S2 | 2.000000 |
| WL | 363.789 NM | CAFL SPECIAL | | 1.445016 | CIR S3 | 2.000000 |
| | | UBK7 SCHOTT | | 1.536451 | CIR S4 | 2.000000 |
| INFINITE CONJUGATES | | | | | CIR S5 | 2.000000 |
| EFL | 223.5276 | | | | CIR S7 | 100.000000 |
| BFL | −85586.9006 | | | | CIR S8 | 100.000000 |
| FFL | 21.0190 | | | | CIR S9 | 100.000000 |
| FNO | 291.5224 | | | | CIR S10 | 100.000000 |
| IMG DIS | 25.4000 | | | | CIR S11 | 100.000000 |
| OAL | 1896.5274 | | | | CIR S12 | 100.000000 |
| PARAXIAL IMAGE | | | | | CIR S14 | 100.000000 |
| HT | 0.0000 | | | | CIR S16 | 85.000000 |
| ANG | 0.0000 | | | | CIR S17 | 85.000000 |
| ENTRANCE PUPIL | | | | | CIR S18 | 85.000000 |
| DIA | 0.7668 | | | | CIR S19 | 85.000000 |
| THI | 0.0000 | | | | CIR S16 | EDG | 100.000000 |
| EXIT PUPIL | | | | | CIR S17 | EDG | 100.000000 |
| DIA | 8.1541 | | | | CIR S18 | EDG | 100.000000 |
| THI | −83209.7851 | | | | CIR S19 | EDG | 100.000000 |

From the expander-collimator, the broad collimated beam is passed through the next element 8, which is a custom made narrow bandpass filter (Andover Corporation, Salem, N.H.) used to filter out the 351.112 nm line and the two weak lines at 351.418 nm and 357.661 nm while allowing the 363.789 nm line to pass on through. This latter line contains about half the power of the laser or about 50 mW. Methods other than the use of a bandpass filter for wavelength selection such as the use of prisms or specially coated reflectors may also be employed. Any of these added components are unnecessary if the laser used already has a built-in means for selecting out the desired wavelength. The output beam is then passed through a pair of plano-aspheric calcium fluoride ($CaF_2$) lenses at 9 and 10 made by diamond turning. These elements, shown in the lens data in Table 1, constitute a beam profile reshaper (see *Rhodes and Shealy* and also *Burkhard and Shealy*, Appl. Opt. 19, pp. 3545–3553 (1980) and 20, pp. 897–909 (1981), respectively, which are incorporated by reference herein) and are used for transversely redistributing the nonuniform Gaussian ($TEM_{00}$) intensity profile of the beam to achieve a substantially even illumination within the exposure subsurface of the photosensitive lens substrate which is placed in an index matching fluid within the space immediately after the hypercomatic objective, composed of lens elements 12, 13, 14 and 15, at the tail-end of the holographic projector system. The beam exiting the profile reshaper is approximately 150 mm in diameter and is put directly into a holographic diffraction grating at 11 which sits at the aperture stop (pupil plane) of the hypercomatic objective.

Figure 3B:
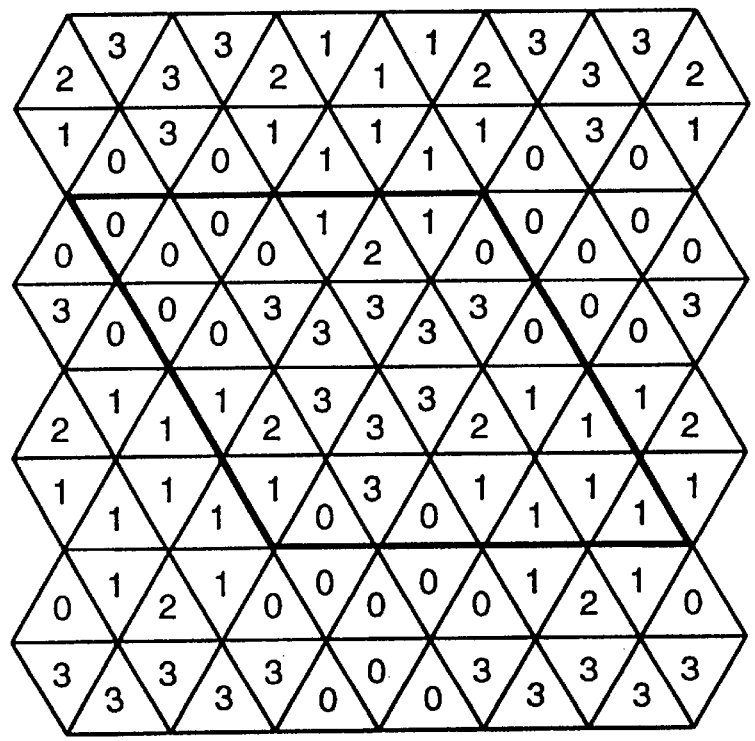
FIG. 3b is a construction diagram of a three phase-level holographic diffraction grating also used in one design of the holographic projector system according to the present invention.

FIGS. 3a and 3b show two very useful holographic diffraction grating designs for use in the holographic projector system for producing three equiangular beams which have a cross-sectional configuration as the apexes of an equilateral triangle. Either grating is positioned at 11 at the pupil plane of the hypercomatic objective. FIG. 3a has four phase-levels and its design is optimized for the three first spectral order beams to each achieve a diffraction efficiency of 0.2500. Its zeroth order diffraction efficiency of 0.0625 which with the first order beams amounts to a total energy fraction of 0.8125. The remaining fraction, 0.1875, is distributed amongst unspecified higher orders.

The numbers 0, 1, 2, and 3 in FIG. 3a refer to the four phase levels. They may be expressed as 0=0, 1=2π/3, 2=π, and 3=5π/3, which is in terms of radians, or by dividing by 2π/λ, they are converted to 0=0, 1=λ/3, 2=λ/2, and 3=5λ/6, which is in wavelength, where λ is equal to one wave of retardation. If the phase level is expressed in terms of radians, the etch depth of each phase level may be calculated by the formula:

$$\phi=(n-1)\, 2\pi h/\lambda$$

where Φ is the phase level in radians, n equals the refractive index of the grating material, 1 equals the refractive index of air, h equals the etch depth, and λ equals the wavelength. Simplifying, the formula for phase level 1 would be:

$$(n-1)h=\lambda/3,$$

or $$h = \lambda/3(n-1)$$

The grating period is equal to the width between the parallel sides of the parallelogram-shaped unit cell which encloses eight triangles as is shown in heavy outline in FIG. 3a.

The design of FIG. 3b has three phase levels and eliminates the zeroth order but is more complex. Also, each first order diffraction efficiency is slightly less at 0.246423 for a total first order diffraction efficiency of 0.739269, and when fabrication errors are considered, this design may have a zeroth order efficiency of a few percent. The phase depths are now 0=0.0, 1=0.295167, 2=0.647584, and 3=2= 0.647584, where 1.0 equals one wave of retardation. The etch depth of the first phase level would be calculated as:

$$h(n-1)/\lambda = 0.295167, \text{ or } h = \frac{0.295167\lambda}{n-1}$$

This design has 32 triangles for each parallelogram-shaped repeatable cell as is shown in heavy outline in FIG. 3b. It is interesting to note that since phase depth 2 is the same as phase depth 3, the holographic diffraction grating will contain a field of regular six-pointed stars within its patterning. The grating period is equal to the width between the parallel sides of the parallelogram enclosing the 32 triangles. Since the features for the same size grating period are half the size of those of FIG. 3a, a holographic diffraction grating of the design of FIG. 3b fabricated with the smallest practical feature size will produce twice the size of projected patterning at a specific distance outward from the holographic projector system as a holographic diffraction grating of the design of FIG. 3a fabricated to the same smallest practical feature size. Thus, the design of FIG. 3b is more limited than that of FIG. 3a when there is a need for downsizing the projected patterning size of the holographic projector system.

The relationship between the grating period and the emitted beam angles is expressed in the following formulae:

$$d = \frac{m\lambda}{\sin \theta_m}, \text{ or } \theta_m = \sin^{-1}\frac{m\lambda}{d}$$

where d equals the grating period, $\Theta_m$ equals the diffraction angle of the mth beam, m equals the diffraction order, and $\lambda$ equals the wavelength of the light.

At the photosensitive substrate level of the holographic projector system, the relationship between the angle of convergence of two interfering light beams and the fringe spacing or distance between intensity maxima, which form long diverging standing wave patterns, is given by the formulae:

$$\Psi = \sin^{-1}\frac{\lambda}{2D}, \text{ or } D = \lambda/2 \sin\Psi$$

Here $\psi$ equals the half angle of convergence between the incident beams, D equals the fringe or intensity maxima spacing, and $\lambda$ equals the wavelength of the light.

FIGS. 4a and 4b show two additional very useful holographic diffraction grating designs for use in the holographic projector system, in this case for producing four equiangular beams in a cross-sectional configuration as the corners of a square. Both designs remove the zeroth order. The design of FIG. 4a has two phase levels and has a diffraction efficiency of 0.164256 for each of the four first spectral order beams, for a total first order diffraction efficiency of 0.657024. The phase levels are 0 and 1, where, in radians, 0=0 and 1=$\pi$. Therefore, the etch depth may be calculated as:

$$(n-1)h=\lambda/2,$$

or $$h=\lambda/2(n-1)$$

The design is like a checkerboard, with either all light squares or all dark squares etched, leaving the other squares unetched. Each cell is a square enclosing four smaller squares as is shown in FIG. 4a in heavy outline. The grating period is equal to the width of a cell or the width of two small squares.

The design of FIG. 4b has four phase levels and is more efficient than the design of FIG. 4a but is also more difficult to fabricate. It has a diffraction efficiency of 0.20264 for each of the four first spectral order beams, for a total first order diffraction efficiency of 0.81056. At four phase levels, it represents an optimal point, as there is no additional improvement in the first order diffraction efficiency for either eight or sixteen phase levels.

The four phase levels in the diagrams, 0, 1, 2, and 3, in radians are 0=0, 1=$\pi/2$, 2=$\pi$, and 3 =3$\pi/2$. Again, each cell is a square enclosing four smaller squares as is shown in FIG. 4b in heavy outline. The grating period is equal to the width of a cell or the width of two small squares. The angles of the four-beam array holographic diffraction gratings are calculated in a manner similar to that of the three-beam array gratings.

To accommodate the 150 mm diameter input beam, the holographic diffraction gratings are made on large synthetic quartz plates (Hoya Type 7.25R25). The circularly-shaped written grating area has very little clearance at four points because the limit on the industry standard e-beam machine is about 152 mm —the table will not move any further than that. The three or four phase level gratings are usually written with one e-beam step and one optical (laser writer) step for reasons that mostly have to do with the difficulty of putting e-beam resist back onto a plate after the first etch. The registration is generally not degraded when writing a large plate with a small address size. The e-beam width for these large plates should be at least ½ micron, which leaves a practical feature limitation size of about 3 microns. Reactive ion etching (RIE) is probably better for smaller features but either RIE or ion milling can be used.

Figure 5:
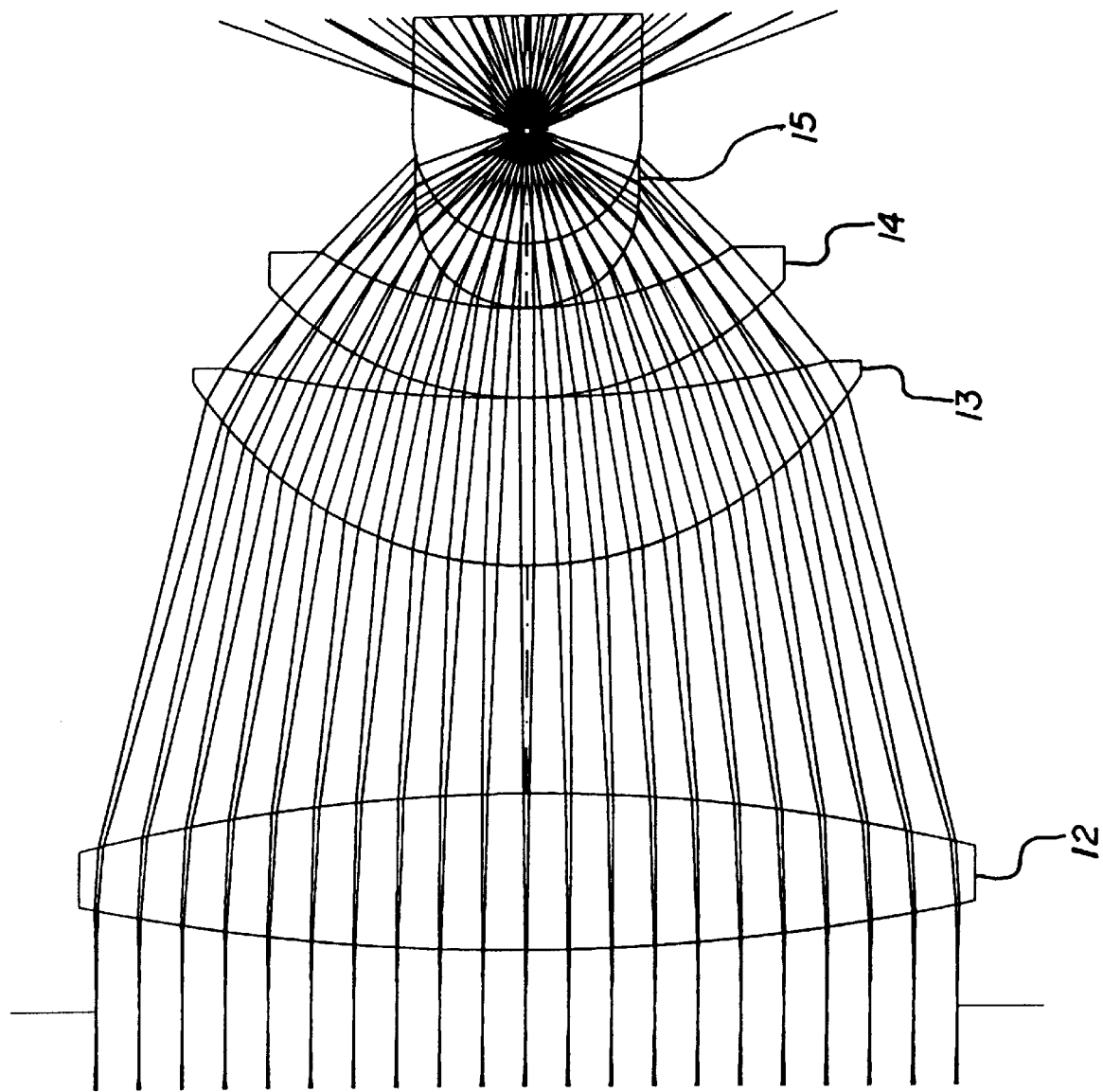
FIG. 5 is an enlarged schematic representation of the hypercomatic objective of the holographic projector system showing a ray trace of input beams at ±1.0 degree.

In FIG. 5, the lens elements, 12, 13, 14, and 15 comprise a hypercomatic objective (see Table 2) shown with a ray trace of two off-axis input beams at ±1.0 degree. The anterior surfaces of lens elements 13 and 14 are both aspheric, with element 14 being a conic section asphere with a convex elliptical surface. These elements may be accurately fabricated from UBK7 optical glass by a relatively recent commercial process known as "diamond grinding" (Applied Physics Specialties, Ltd., Dow Mills, Ontario, Canada). All elements of the holographic projector system except for perhaps the posterior side of element 15 should have antireflection (AR) coatings. In the lens data in Table 2, element 15 appears to be the first element of a matching-sided triplet of lens elements all composed of K10 optical glass. There are two alternative fabrications of lens element 15, the second alternative offering the most versatile uses for the holographic projector system.

In the first alternative, the first and second K10 lens elements are fabricated all in one piece so that the posterior side of lens element 15 is flat instead of concave. The third K10 element is then omitted. The flat posterior side of element 15 is coated with optical blacking except for a round hole in the coating in the center of the lens which acts as an aperture for blocking out the unwanted second and higher order diffractions from the holographic diffraction grating which separate out outside the aperture at this focal plane region. The aperture also blocks out scattered and aberrational light. Instead of the optical blacking, the aperture may be made from a thin piece of opaque substrate containing a round hole and it is affixed to the lens. In the center of the lens in the center of the aperture a small dot of optical blacking is placed to block out the unwanted zeroth order focal spot. (A small amount of zeroth order generally occurs because of fabrication error in the holographic diffraction gratings. The holographic diffraction grating in the design of FIG. 3a also has a zeroth order diffraction efficiency of 0.0625.) The hypercomatic objective is then used under immersion conditions. This is necessary because most of the photosensitive substrates, particularly those for the fabrication of the index modulated microlenticular mosaic lenses and the microlenslet arrays, are exposed through the base of the substrate. A preferred refractive index matching fluid is Cargille Laser Liquid Code 5610 (R. P. Cargille Laboratories, Inc., Cedar Grove, N.J.) which is custom matched to the index of K10 at 363.789 nm and has approximately 96% transmittance through a 1.0 cm path at this wavelength. (K10 was chosen because many of the experimental substrates were made from CR-307® plastic resin (PPG Industries, Inc.) which has a refractive index of 1.5223±0.0005 at 363.789 nm and closely matches K10 at this wavelength).

The second alternative is to omit the second K10 element and make this the index matching fluid. In this case the third K10 element is a window 1.0 mm in thickness and the aperture and the small dot is instead placed on the anterior side of the window. The system is then immersed in more index matching fluid. This is a very versatile system because, as long as the index fluid, the window, and the substrate have closely matching indices, a wide variation of substrate indices may be chosen because, due to the design of the holographic projector system, there will be little appreciable effect on the patterning. For example, the substrate and the window may be made of polymethylmethacrylate (PMMA), which is the material from which most IOLs are fabricated and the index fluid may then be matched to the PMMA.

With the second alternative, the index fluid and the window may be removed altogether and the system used in air with little effect on patterning. In this case, a substrate aperture is mounted in place and a thin protruding piece of opaque material may be used to block out the unwanted zeroth order.

Figure 6A:
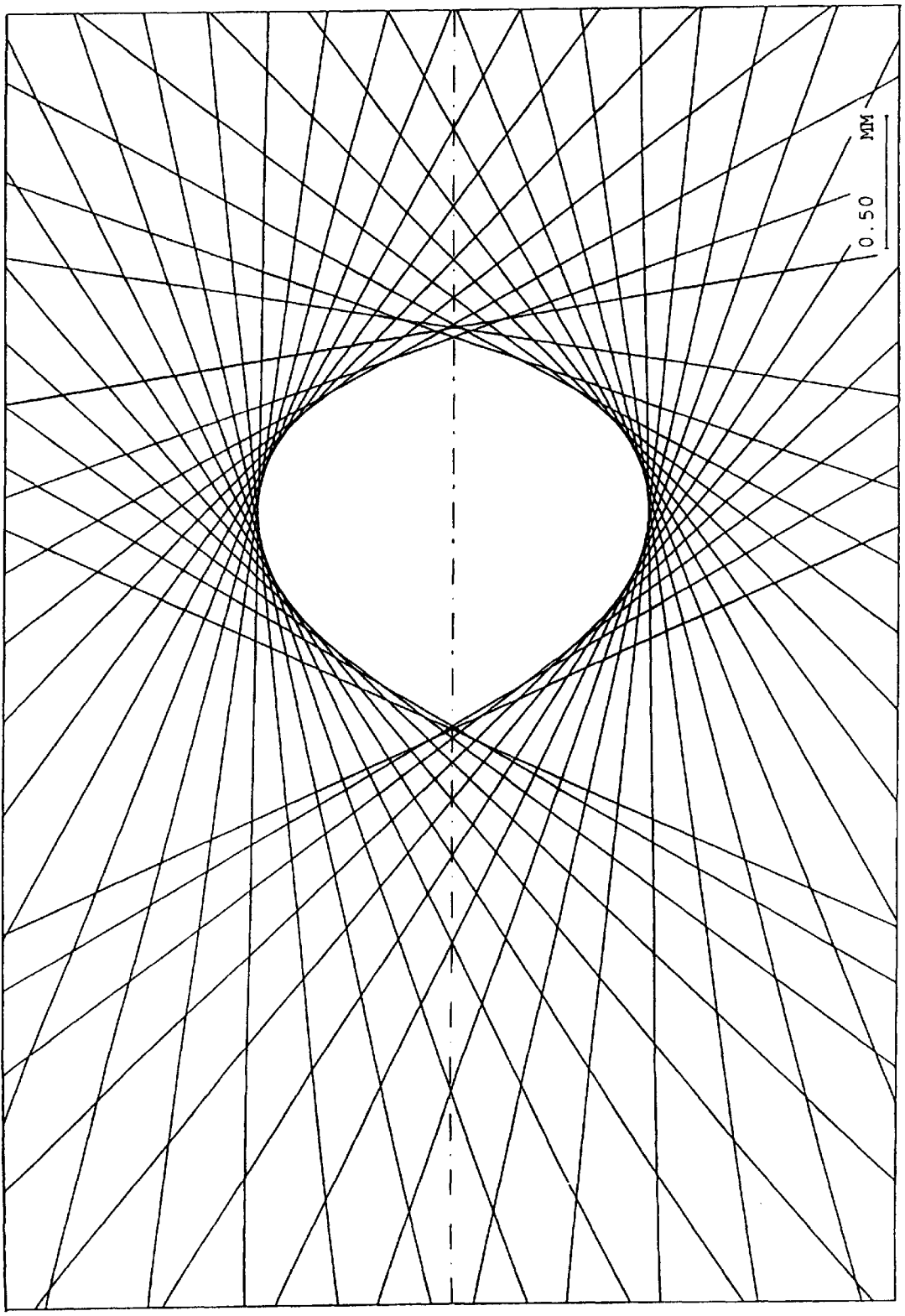
FIG. 6a is an enlarged schematic ray trace representation of a caustic formed by input beams at ±1.0 degree.
Figure 6B:
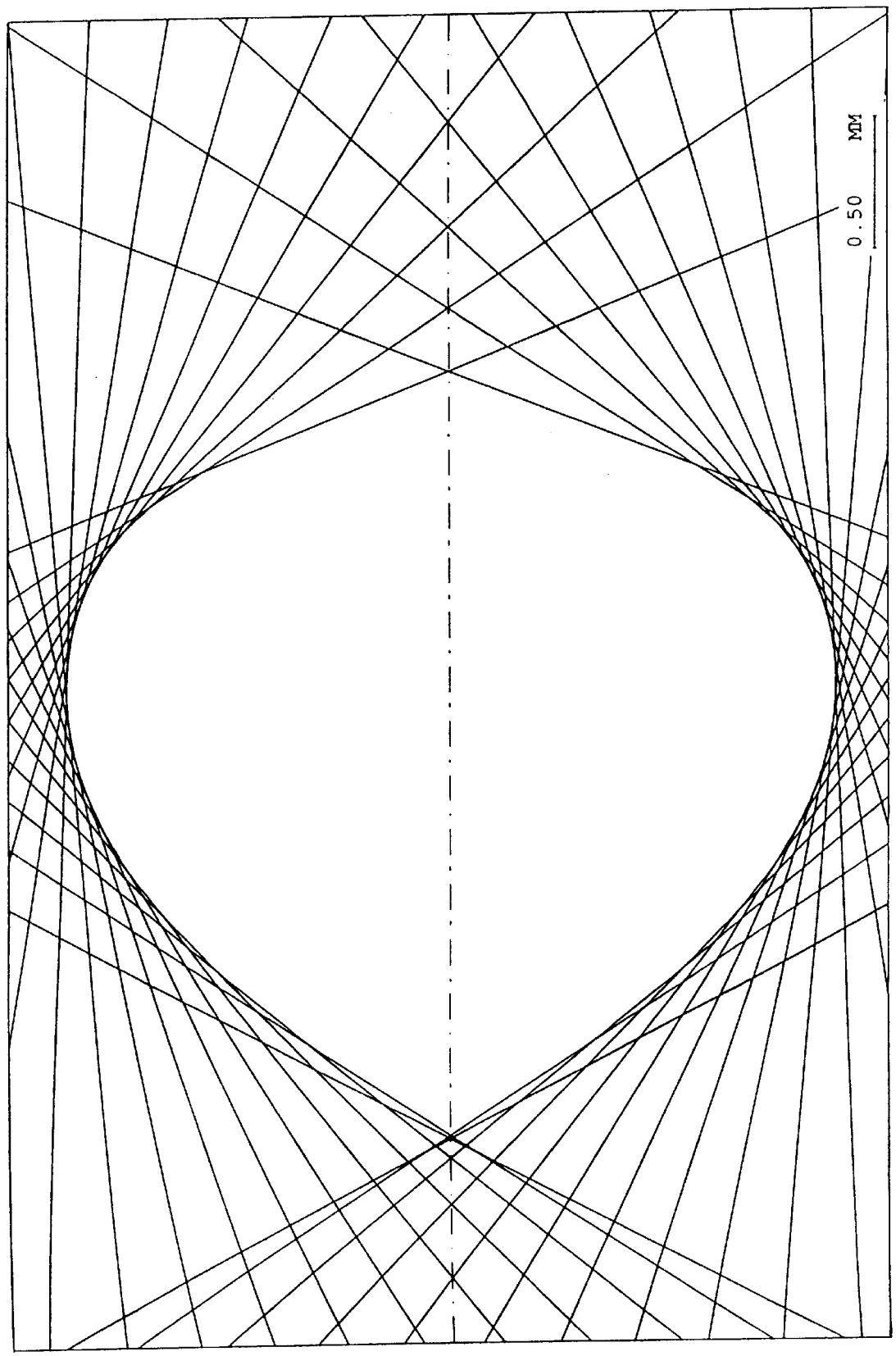
FIG. 6b is an enlarged schematic ray trace representation of a caustic formed by input beams at ±2.0 degrees.

The hypercomatic objective is designed so that an aberration of coma forms a somewhat circular envelope or boundary on the optical axis side of the grouping of ray fans in the vicinity of the image within which there is no radiation. This caustic is shown in enlarged detail in FIG. 6a as a result of two off-axis input beams at ±1.0 degree. FIG. 6b shows the caustic formed by input beams at ±2.0 degrees, and FIG. 6c shows the caustic formed by input beams at ±4.0 degrees.

TABLE 2

Lens Data
HYPERCOMATIC OBJECTIVE (IMMERSION)

| ELEMENT NO. | RDY >OBJ: | | THI INFINITY | GLA | |
|---|---|---|---|---|---|
| | STO: | INFINITY | 10.000000 | | |
| 12 | 2: | 374.44010 | 28.000000 | UBK7_SCHOTT | |
| | 3: | −311.61261 | 39.837372 | | |
| 13 | 4: | 63.84576 | 30.015398 | UBK7_SCHOTT | |
| | ASP: | | | | |
| | K | −0.199721 KC: | 100 | | |
| | IC: | YES CUF: | 0.000000 | CCF: 100 | |
| | A: | 0.000000E + 00 B: | −313517E-11 | C: 0.000000E + 00 | D: 0.000000E + 00 |
| | AC: | 100 BC: | 0 | CC: 100 | DC: 100 |
| | 5: | 231.73257 | 0.1000000 | | |
| 14 | 6: | 58.24825 | 15.923614 | UBK7_SCHOTT | |
| | CON: | | | | |
| | K: | −0.133709 KC: | 0 | | |
| | 7: | 66.81690 | 0.100000 | | |
| 15 | 8: | 19.56129 | 11.443147 | K10_SCHOTT | |
| | 9: | 20.00000 | 20.000000 | K10_SCHOTT | |
| | 10: | INFINITY | 1.000000 | K10_SCHOTT | |
| | IMG: | INFINITY | 0.000000 | | |
| | | | | INFINITE CONJUGATES | |
| | | | | EFL | 63.4941 |
| | | | | BFL | 1.0006 |
| SPECIFICATION DATA | | | | FFL | 60.8890 |
| EPD | | 150.00000 | | FNO | 0.2778 |
| DIM | | MM | | IMG DIS | 1.0000 |
| WL | | 363.789NM | | OAL | 155.4195 |
| XAN | | 0.00000 | 0.00000 | PARAXIAL MAGE | |
| YAN | | 0.25000 | −0.25000 | HT | 0.1818 |
| VUY | | 0.00000 | 0.00000 | ANG | 0.2500 |
| VLY | | 0.00000 | 0.00000 | ENTRANCE PUPIL | |
| | | | | DIA | 150.0000 |
| REPRACTIVE INDICES | | | | THI | 0.0000 |
| GLASS CODE | | | 363.789NM | EXIT PUPIL | |
| K10_SCHOTT | | | 1.523765 | DIA | 102.6521 |
| UBK7 SCHOTT | | | 1.536445 | THI | 44.4526 |

The way the light rays form the near-circular caustic with progressive tangents around its curvature provides a system for correcting the foreshortening of the interferometric angles at off-axis points toward the edges of a near-spherical wide-angle field. This foreshortening of the angles otherwise causes a stretching or pincushion distortion in the grid patterning towards the edges of the field. This occurs because the smaller the interferometric angles are, the bigger the pattern gets. By modifying the shape of the caustic, a wide variety of curved pattern fields can be created so that for a given curved substrate, there will be substantially constant interferometric angles at various points subtended from the substrate.

If the caustic is optimized to a circular shape, the bisectors of the interferometric angles will all intersect at a common point at the center of the caustic. In the three-beam or four-beam system, the bisectors correspond to an imaginary line following along the axial center of each three- or four-ray interferometric light bundle and passing through the common intersection point. However, if the caustic is elliptical, these imaginary lines, corresponding to the bisectors, will form a locus of points and will distribute along the optical axis. The directionality of these imaginary lines is very important because they fall in the same trajectories as the meridional ray paths of the microlenslets of the microlenticular mosaic which is formed in the index modulation medium as a result of the exposure and processing.

For beam input angles starting at about ±1.0 degree and larger, not all of the extreme rays get through the hypercomatic objective. This is not due to a failure of the optical design, but is a result of beam overlap. The part of the beams that overlap onto the periphery of the field and do not cross the other beams are non-interferometric and are thus not useable. As the input beams go from ±1.0 degree to larger angles, there is more and more of a trade-off to smaller pattern size for less field angle.

As the angle of the off-axis input beams increases, the angular amount of peripheral non-interferometric beam overlap increases, and the addition of this angular amount on opposite sides (including the angle between the input beams) subtracts from the angular amount of the interferometric or working field that is available. This is why it is useful to start with a very wide-angle optical design. In the three-beam system, because it does not have bilateral symmetry, the subtracted amount is equal to double the non-interferometric beam overlap on one side along with double the off-axis angle for a single input beam.

Figure 7A:
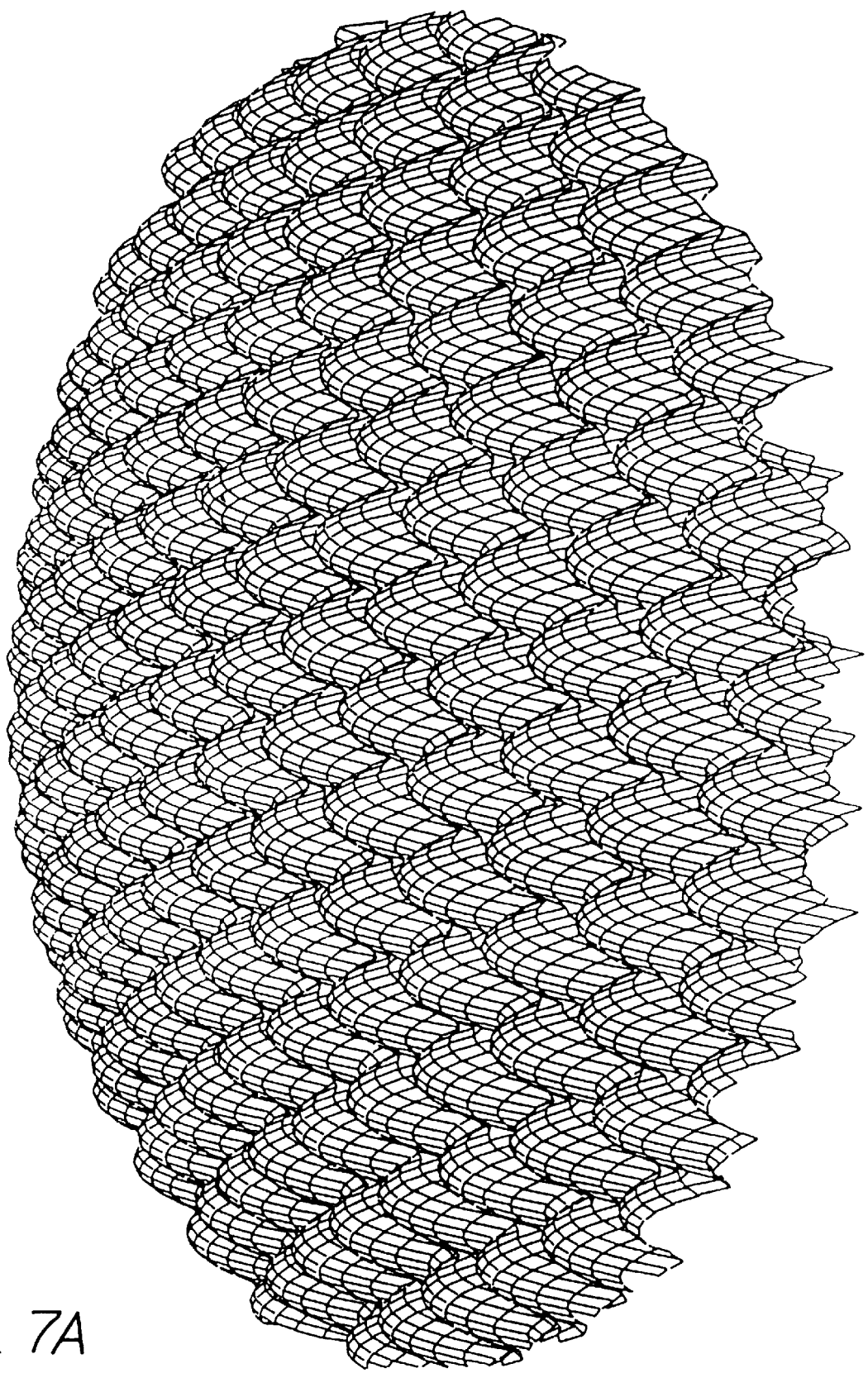
FIG. 7a is a three-dimensional computer generated isometric view of the three-beam microlenticular mosaic as it is defined by an index gradient.
Figure 7B:
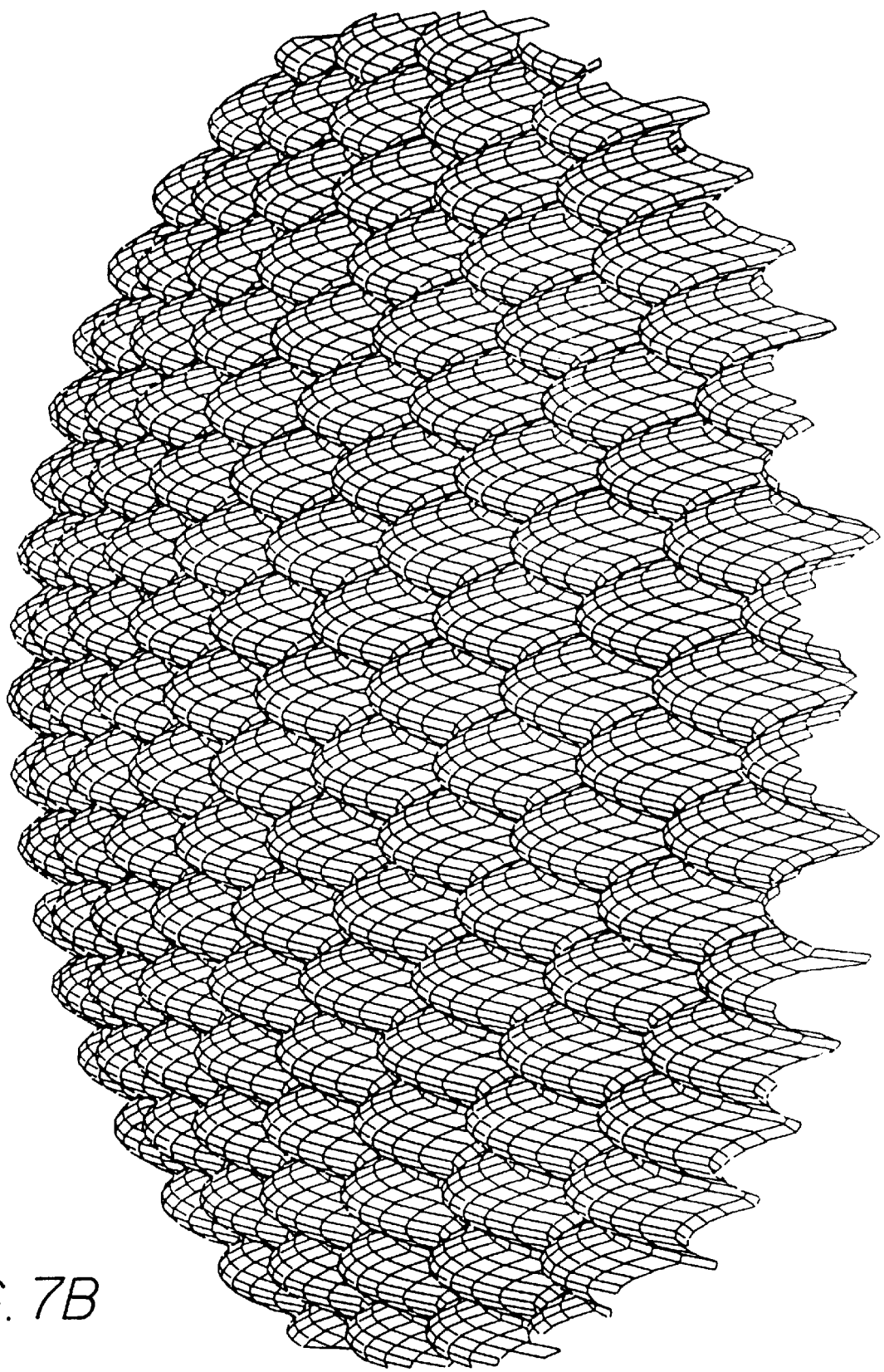
FIG. 7b is a three-dimensional computer generated isometric view of the four-beam microlenticular mosaic as it is defined by an index gradient.

Within the present invention, there are two preferred types of modulated index microlenticular mosaics for use as lenses. FIGS. 7a and 7b illustrate the curved field coherent equiangular three-beam and equiangular four-beam standing wave patterns respectively, as they are created within a substrate with their contours defined by an index gradient. When used as optical elements, they may be classified as three- or four-beam zeroth order holographic sinusoidal volume transmission gratings. (The three-beam pattern is of a more complexed sinusoidal shape.) But unlike most volume transmission holograms, due to absorption, the sinusoidal modulations create near-paraboloidal index-defined contours which do not extend clear through the thickness of the film coating of the index modulation medium. Therefore, the optical effects are essentially independent of the film thickness provided that the film is sufficiently thick to contain the sinusoidal peaks.

For near zeroth order propagation, the periodicity or microlenticular spatial frequency must be brought to close range but not necessarily equal to or less than the wavelength of the light $\lambda$. This realm can be designed to accommodate the propagation of the entire visible spectrum with nearly evanescent diffractive orders if the total $\Delta n$ index gradient difference is kept small. The medium then still behaves anisotropically. If the microlenticular spatial frequency is designed higher and higher, eventually as it gets into the subwavelength, the medium will become isotropic, behaving as if there were no microlenticular mosaic present. Although surface relief grating structures with a period comparable to $\lambda$ often display strong color and polarization effects, no such characterizations have been associated with the subsurface index-defined microlenticular mosaics. Nor is there evidence of the prominent chromatic aberrations, characteristic of diffractive optical elements, which fan-out in reverse wavelength sequence to those of refractive optical systems.

FIGS. 8a and 9a are two-dimensional computer plots of the equiangular three-beam and equiangular four-beam standing wave interference pattern, respectively, each showing a regular array of antinodes (see U.S. Pat. No. 4.496,216 (1985), and U.S. Pat. No. 4,421,398 (1983)). Viewed as topographical maps, each time a line is crossed, the intensity changes by one unit. From the center of each bright periodic spot or intensity maxima to one of the surrounding areas of zero or low intensity, approximately nine lines are crossed in the three beam pattern of FIG. 8a and approximately sixteen lines are crossed in the four beam pattern of FIG. 9a. This results in the constructive interference areas at the center of each periodic spot being either nine or sixteen times more intense than the areas where destructive interference predominates, which are near the edges of the areas surrounding each periodic spot.

Figure 8B:
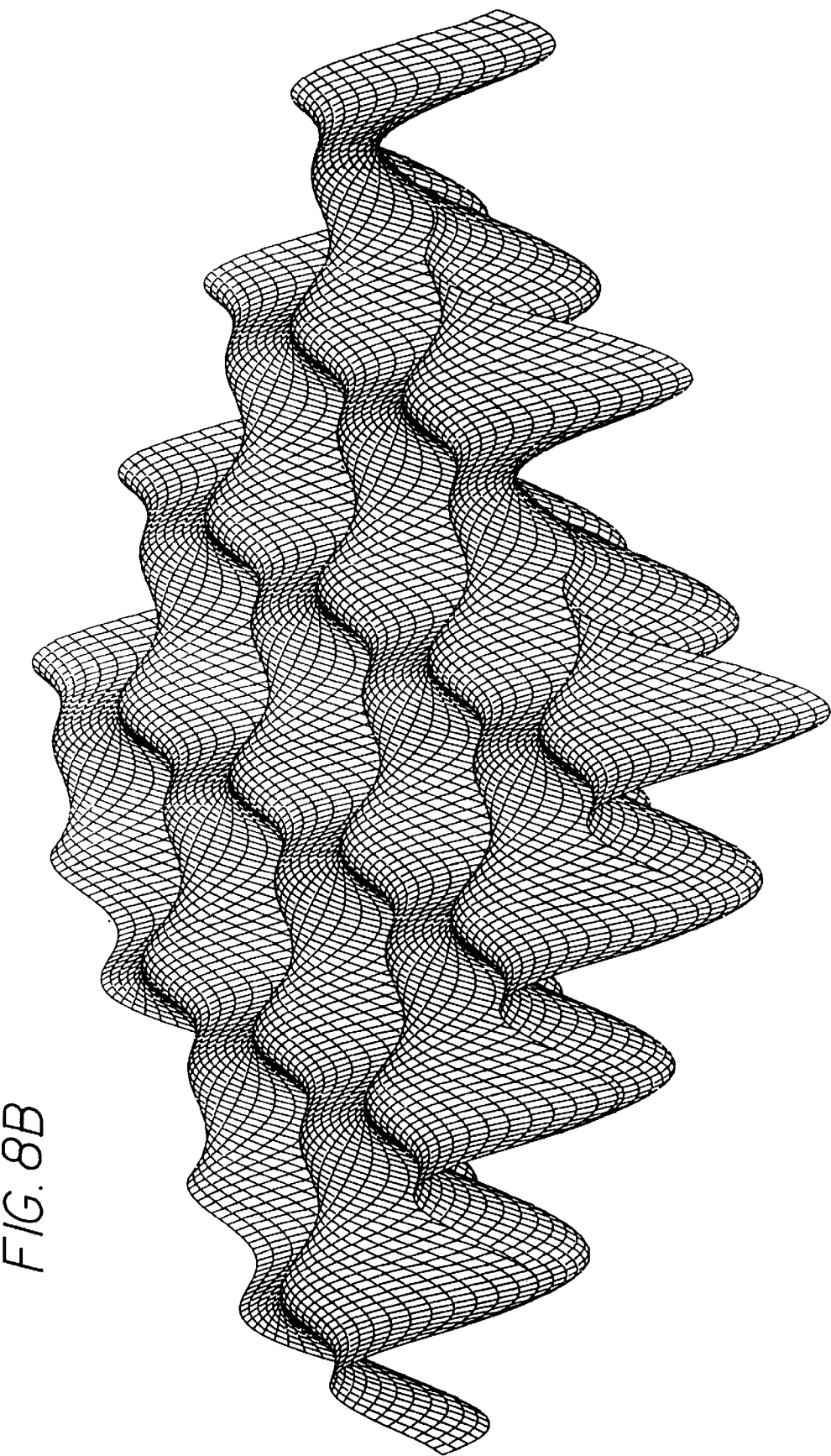
Figure 9B:
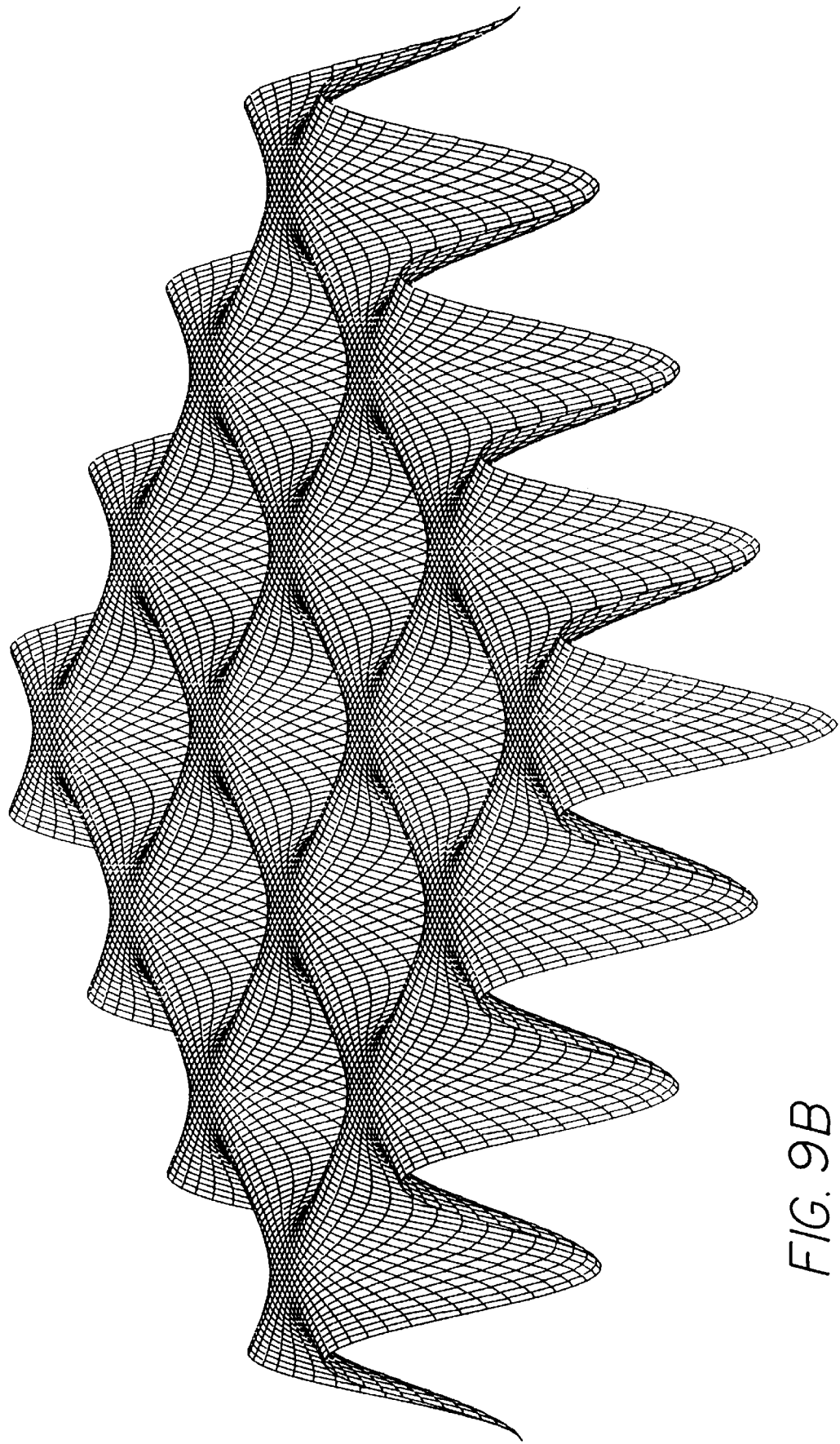
Figure 10:
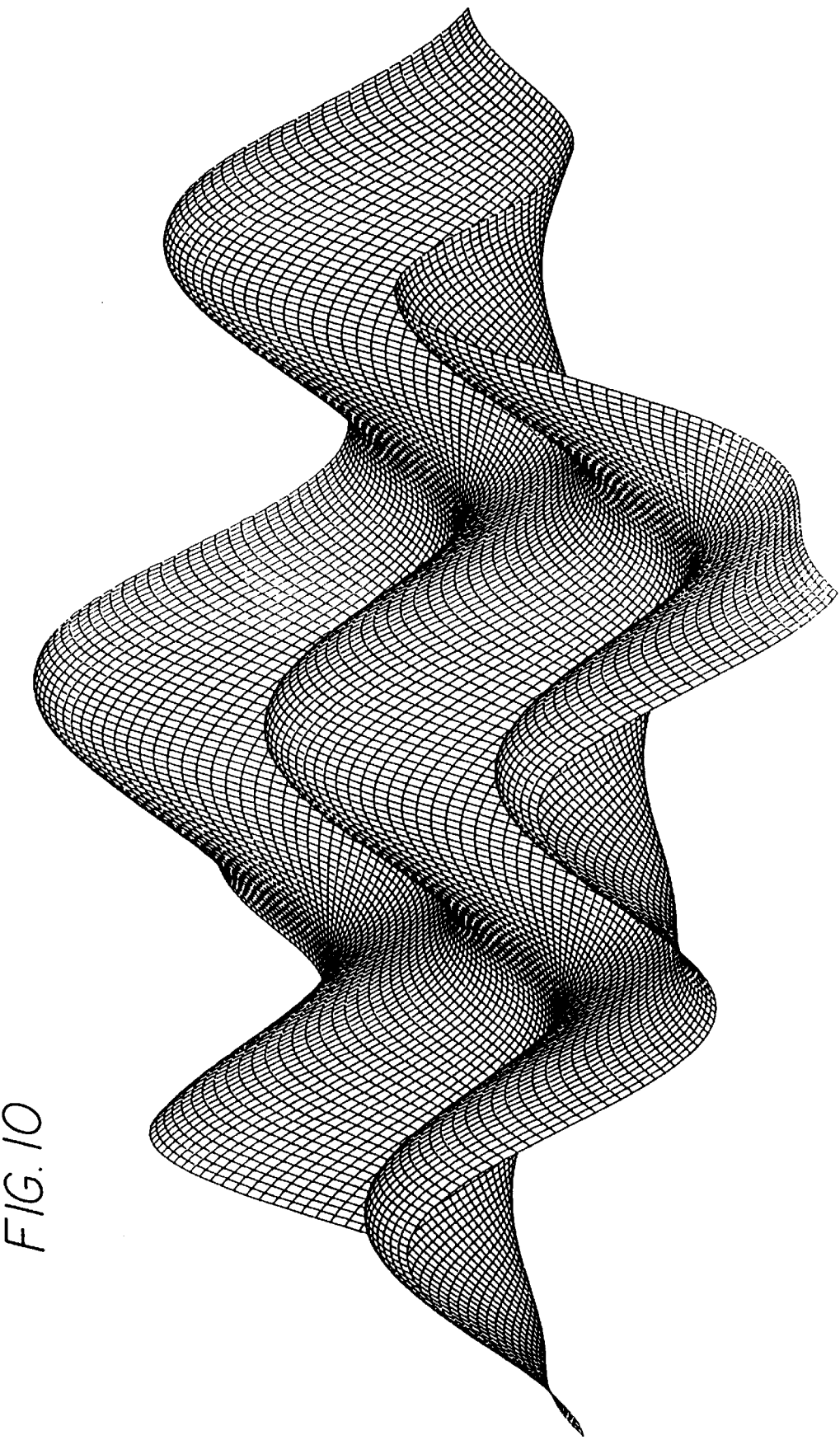

FIGS. 8b and 9b are, respectively, inverted isometric views of the intensity patterns of FIGS. 8a and 9a, spatially illustrating the periodic spots as antinodal intensity wells. FIG. 10 is a non-inverted isometric view of the three-beam pattern of FIG. 8a, showing a single antinodal intensity peak surrounded by six partial intensity peaks. FIGS. 8b, 9b, and 10 have been profiled on the laser analysis program GLAD® (Applied Optics Research, Pittsford, N.Y.). The six zero intensity points surrounding each periodic spot in FIG. 8a can be seen as small protuberances surrounding each antinodal well in FIG. 8b, but are much more apparent as low points surrounding the central intensity peak in FIG. 10. Completely surrounding each periodic spot shown in the four-beam plot of FIG. 9a are lines of zero intensity which can readily be seen surrounding each antinodal well depicted in FIG. 9b.

Figure 11A:
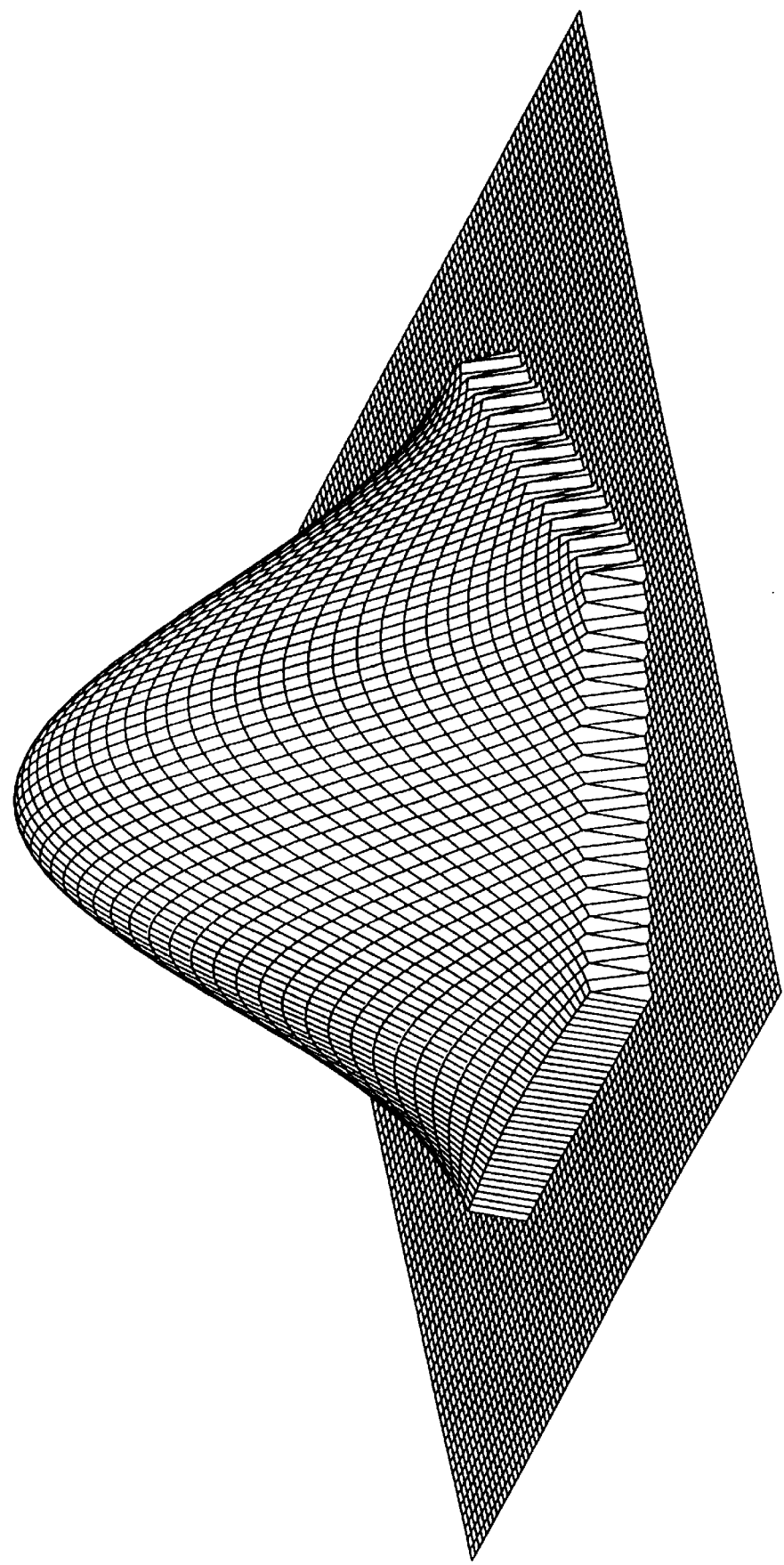
FIG. 11a is a three-dimensional computer generated isometric view of a three-beam integral microlenslet as it is defined by an index gradient.
Figure 11B:
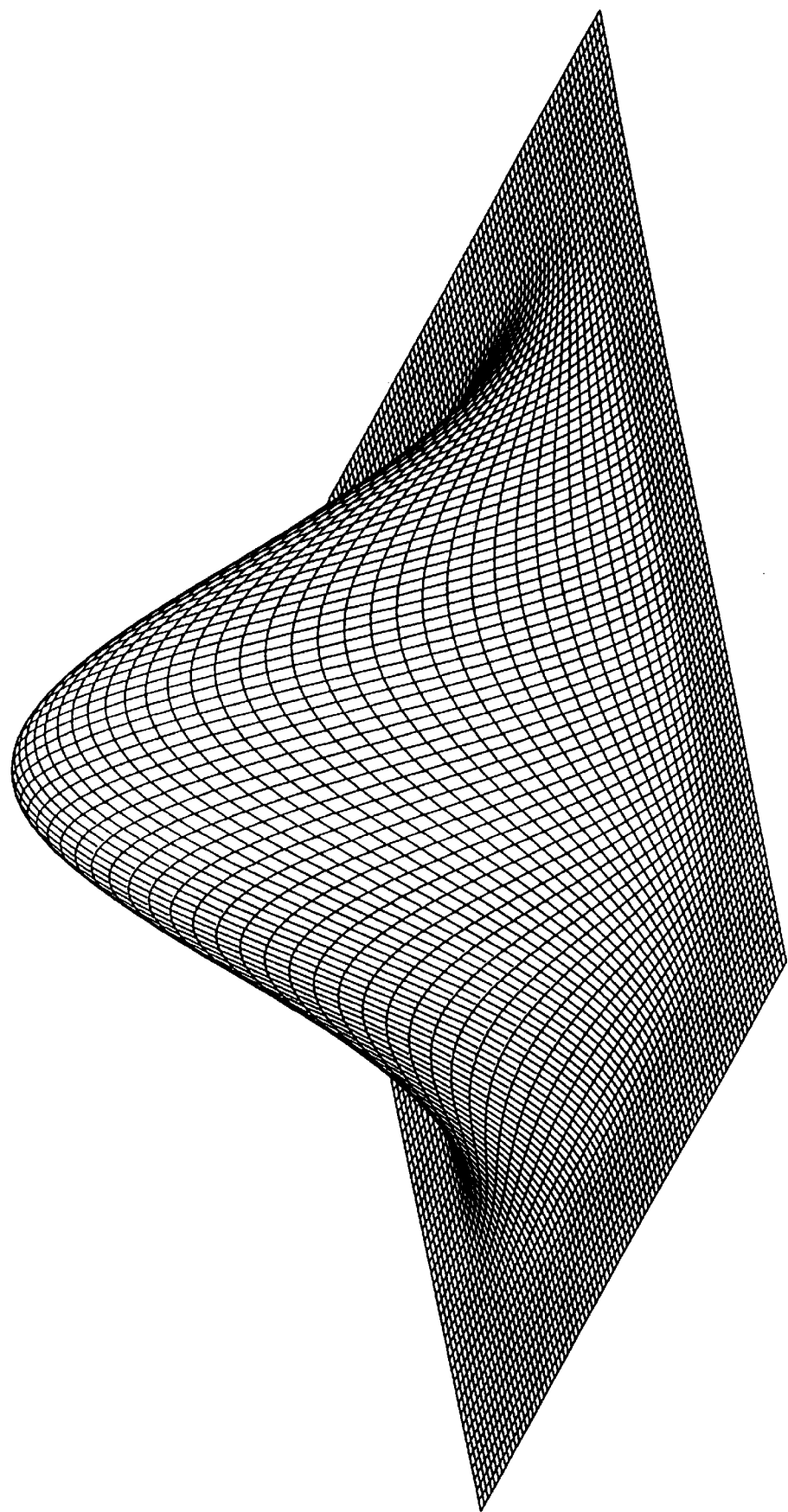
FIG. 11b is a three-dimensional computer generated isometric view of a four-beam integral microlenslet as it is defined by an index gradient.

FIGS. 11a and 11b are three-beam and four-beam integral sinusoidal microlenslets respectively, as profiled on GLAD®, as they are created within an index modulation photopolymer with their shapes defined by an index gradient. As mentioned previously, the three-beam interference exposure pattern has a maximum intensity $I_{MAX}=9$ at the center of each periodic spot. It may be shown by calculation that at I=1, the contour is an exact hexagon as is shown in FIG. 11a at the top of the skirted area near the base of the microlenslet. Similarly, the four beam pattern, which has a maximum intensity $I_{MAX}=16$ at the center of each periodic spot may be shown by calculation to have a contour at I=0 of an exact square as shown at the base of the microlenslet of FIG. 11b.

The microlenslets form integral parts of the modulated index lens. Each microlenslet, being near the wavelength of the light in size, acts as a transition point, where the cone of input light converges to enter the front index surface, and, because it is a positive microlenslet, the cone of light which exits and diverges from the back index surface is slightly smaller in angular size, with its ray components slightly more compacted toward the principal or chief ray than are the rays of the input cone.

The use of a holographic diffraction grating of the design of FIG. 3a with a grating period of 5.196 microns will produce a hexagonal patterning with a width of approximately one micron measured between two opposite sides of a hexagon at a distance outward along the optical axis of 13.81 mm from the center of the caustic. The use of a holographic diffraction grating of either the design of FIG. 4a or FIG. 4b with a grating period of 6 microns will produce a square patterning with a width of approximately one micron at the same distance outward along the optical axis from the center of the caustic. In both cases, a single off-axis beam input angle is approximately 3.47606°.

For fabrication of a preferred embodiment of the extreme depth-of-field modulated index lens of the present invention, a three-beam holographic diffraction grating of the design of FIG. 3a is placed in the holographic projector system, although a four-beam holograph diffraction grating can also be used. The three-beam system tends to be easier to use because the exposure time for obtaining good results is not quite as critical as that of the four-beam system. A lens with one surface having a convex radius of curvature of 13.81 mm and made from a plastic such as CR-307® or PMMA is used as the substrate. A glass or crystalline lens may also be used as the substrate. The window and the index fluid in the holographic projector system should have refractive indices closely matching that of the substrate. The 13.81 mm radius of curvature side of the substrate is spin coated with an index modulation medium to a preferred thickness of 3 to 5 microns. A preferred material is DuPont HRF-600® holographic photopolymer but other index modulation photopolymers such as DMP-128® (Polaroid Corporation) may be used. Dichromated gelatin (DCG), although more difficult to work with, can also be used. At the preferred microlenticular mosaic periodicity of one micron, HRF-600® has index modulation response of about $\Delta n=0.03$. Some earlier formulations of DuPont described in U.S. Pat. No. 3,658,526 (1972) are also very useable although the index modulation response $\Delta n$ is generally below 0.01.

HRF-600® is available either as a thin emulsion on sheets of film or as a solution. In either form it is dissolved or diluted to a very dilute solution with a mixture of 75% methylethylketone (MEK) and 25% toluene. A great deal of the yellowish tinge which is due to the visible light sensitizing dye material may be removed by treating the solution with a decolorizing carbon such as Norit A®. HRF-600® without visible light dye sensitizer is available from DuPont on special order.

Tinuvin® 328 (Ciba Geigy Corporation) is then dissolved in the solution to a concentration of between 0.5% to 1.0% by weight of the HRF-600® photopolymer. (Tinuvins® are 2-(2'-hydroxyphenyl) benzotriazoles and are UV absorbents for radiation between about 290 nm to 400 nm but still transmit visible light. A UV absorbent is useful here for keeping the holographic patterning from being completely transitional through the thickness of the film of index modulation medium.) The solution is then filtered and then vacuum rotary evaporated to about 38% solids. Following that, the substrate is spin coated at about 2500 rpm for about 90 seconds.

The substrate is then thoroughly dried with warm air and placed in immersion at the end of the holographic projector system so that the 13.81 mm radius of curvature side of the substrate is at a distance of 13.81 mm from the center of the caustic and the exposure will be through its base. Index matching fluid such as Cargille Laser Liquid Code 5610 has a siloxane composition and has no solvating effect on the coating. Other index fluids, such as Isopar A® (Exxon) will have some solvating effect, but only after a long immersion. The exposure is typically 5 to 50 $mJ/cm^2$. The substrate is cured with a UV/visible mercury-xenon lamp with at least 100 $mJ/cm^2$, and then heat processed for two hours at 120° C. (see *Proc. SPIE*, Vol. 1555, pp. 256–267 (1991) and Vol. 2043, pp. 2–13 (1993)).

The holographic projector system can be designed for other wavelengths and has many other uses such as for the production of directional light filters. These are clear plastic resin substrates containing an imaging substance in the form of a three-dimensional honeycomb-like grid or pattern. There is a sufficiently long enough aspect ratio to produce an absorption effect on light that differs in incidence to the direction of normal propagation through the clear resin channels either to a selected distribution or to a focus or convergence point. Diazo materials are preferred for use as imaging substances because they are positive acting, producing azo dye in non-exposed areas (see "Diazo Papers, Films, and Chemicals," by Henry Mustacchi, pp. 61–155, in *Handbook of Imaging Materials*, edited by Arthur S. Diamond, Marcel Dekker, Inc., New York (1991)). An ideal laser line for exposing diazo materials during the fabrication of directional light filters is that of 413.133 nm from a krypton ion (Kr) laser.

Diazo materials which are soluble in relatively nonpolar solvents such as toluene are generally more soluble in plastic resins and are thus very useable for the formulating of or thermally transferring into plastic resins. Diazo hexafluorophosphate salts in which the diazo molecule contains a long chain aliphatic group suits this purpose. Compounds such as these are described in Jpn. Kokai Tokkyo Koho JP 61, 172, 856 [86,172,856] (1986) (C.A. 106: 157954u).

Reverse vesicular diazo, described in U.S. Pat. No. 3,120, 437 (1964), is also a positive imaging system and may be used by itself or in combination with conventional diazo imaging systems. Vesicular diazo, described in the same patent, is a negative imaging system, but still can have some utility.

The holographic projector system may be used with photoresists or photodefinable materials for producing relief patterns. The patterns may be mesh patterns, or, if the photoresist is positive acting and the exposure is made through the base of the substrate, the result after processing will be close-packed microlens arrays resembling the microlenticular mosaic patterns of FIGS. 7a and 7b. The lenslets assume a near parabaloid shape. Photodefinable materials such as photoactivated bisbenzocyclobutene resins are especially useful for this purpose and 363.789 nm is an ideal exposure wavelength. They are known as Photo-Imageable BCB Resins® (The Dow Chemical Company, Midland, Mich.).

The holographic projector system, particular with the four beam patterning, can be used for the fabrication of microchannel plates from photosensitive glass. This glass, either Foturan® (Schott Glass Technologies, Inc.) or PEG-3® (Hoya) has a peak spectral sensitivity at about 312 nm. The holographic projector may be optimized for a laser line close to this wavelength such as the argon ion (Ar) laser line at 333.613 nm. The photosensitive glass is exposed, heat treated and etched with hydrofluoric acid according to processing procedures supplied by the manufacturer. The microchannel plate may be used as elements in charge coupled devices (CCDs) such as image intensifiers. They may also be used as directional focusing lenses for X-rays.

By fabricating all the lens elements of the holographic projector system including the holographic diffraction gratings from calcium fluoride ($CaF_2$) or magnesium fluoride ($MgF_2$), the system may be used at eximer laser wavelengths. The 193 nm laser line produced by an argon fluoride (ArF) eximer laser can be used for producing subwavelength patterning on curved surfaces.

Various embodiments and suggestions have herein been disclosed for the design of this inventive system. However, specific embodiments and suggestions such as particular lens diagrams have been given for illustrative purposes and should not be construed to impose limitations on this disclosure. Many variations and modifications of the preferred embodiments both in the materials and in the design are possible while keeping within the scope of the appended claims.

What is claimed is:

1. A holographic projector system for exposing a photosensitive substrate, comprising:

a laser light source providing a relatively narrow beam of substantially collimated light;

means for expanding and distributing the intensity profile of said narrow beam to provide an expanded beam of substantially collimated light having a selected energy level distribution;

means for separating said expanded beam into a plurality of at least three substantially collimated beams which diverge with respect to each other, said beam separating means comprising a holographic diffraction grating; and means for converging said plurality of beams toward each other thereby effecting their subsequent divergence from each other in order to result in crossing of their paths to produce a three-dimensional standing wave interference pattern for incidence upon the substrate, whereby said interference pattern produces a lattice of diverging intensity maxima in the photosensitive substrate, and wherein said converging means comprises an objective lens system with highly induced coma including a consecutive series of lens elements aligned along a common axis whereby said plurality of beams creates a profile in the vicinity of a focal region wherein there is no radiation, and said objective lens system with highly induced coma disposed between said beam separating means and the substrate provides a means for producing a corrected three-dimensional standing wave interference pattern with substantially constant interferometric angles at points subtended from the substrate.

2. The holographic projector system of claim 1 wherein the photosensitive substrate comprises a type of lens selected from the group consisting of intraocular lens, contact lens, and artificial cornea.

3. The holographic projector system of claim 1 wherein the photosensitive substrate includes a photosensitive material selected from the group consisting of photoresist, photodefinable resin, photosensitive glass, index of refraction modulation media, light occluding media, and light absorption media.

4. The holographic projector system of claim 3 wherein said index of refraction modulation media is selected from the group consisting of a dichromated gelatin and a photopolymer material.

5. The holographic projector system of claim 3 wherein said light absorption and occluding media is derived from a material selected from the group consisting of silver halide, leuco dye, and diazo material.

6. The holographic projector system of claim 3 wherein the photosensitive substrate is exposed while immersed in a refractive index matching liquid.

7. The holographic projector system of claim 3 wherein the photosensitive substrate is exposed while in air.

8. The holographic projector system of claim 3 wherein the photosensitive substrate comprises a photosensitive glass processed after exposure and etched to produce a relief pattern.

9. The holographic projector system of claim 3 wherein the photosensitive substrate comprises a photodefinable resin processed after exposure to produce a relief pattern.

10. The holographic projector system of claim 3 wherein said index of refraction modulation media contains an ultraviolet light absorbent.

11. The holographic projector system of claim 1 wherein the photosensitive substrate includes a photosensitive material comprising vesicular diazo material.

12. The holographic projector system of claim 1 wherein the photosensitive substrate includes a photosensitive material comprising reverse vesicular diazo material.

13. The holographic projector system of claim 1 wherein the photosensitive substrate includes a photosensitive material comprising reverse vesicular diazo material in combination with azo dye imaging material.

14. The holographic projector system of claim 1 wherein said substrate has a photosensitive coating thereon.

15. The holographic projector system of claim 1 wherein said substrate has a photosensitive material distributed therein.

16. The holographic projector system of claim 15 wherein said photosensitive material comprises a diazo compound.

17. The holographic projector system of claim 15 wherein said photosensitive material comprises a diazo compound with a long chain aliphatic group.

18. The holographic projector system of claim 15 wherein said photosensitive material comprises a diazo compound soluble in a relatively nonpolar solvent.

19. The holographic projector system of claim 1 wherein said holographic diffraction grating divides the incident expanded beam principally into three mutually diverging spectral order beams of substantially the same intensity profile.

20. The holographic projector system of claim 1 wherein said holographic diffraction grating divides the incident expanded beam principally into four mutually diverging spectral order beams of substantially the same intensity profile.

21. The holographic projector system of claim 1 further including aperture means for blocking undesired spectral order beams projected by said holographic diffraction means and scattered light.

22. The holographic projector system of claim 1 further including means for blocking undesired zeroth spectral order beams projected by said holographic means by use of blocking device selected from the group consisting of blackened spot on window or thin protruding piece of opaque material.

23. The holographic projector system of claim 1 wherein the diverging lattice of intensity maxima is formed so that said maxima are generally of uniform dimension and diverge from a central point.

24. The holographic projector system of claim 1 wherein the diverging lattice of intensity maxima is formed so that said maxima are generally of uniform dimension and diverge from selected distribution points.

25. The holographic projector system of claim 1 wherein said means for expanding and distributing said narrow beam comprises beam expander means for reshaping said narrow beam to said expanded beam, and beam profile distributor means for distributing the intensity of the beam wavefront in a selected manner across the profile of said expanded beam.

26. The holographic projector system of claim 1 wherein said selected energy profile provides substantially the same intensity in each region of intensity maxima at various locations of incidence across the surface of the substrate.

27. The holographic projector system of claim 1 wherein said holographic diffraction grating is defined as:
- a diffraction grating for use at a design wavelength, wherein the grating comprises a repetitive pattern of rhombic unit cells;
- wherein each rhombic unit cell comprises four rhombic portions, a first pair of the rhombic portions being adjacent each other along a first side of the unit cell, and the remaining pair of the rhombic cell portions being adjacent each other along a second side of the unit cell, the remaining pair of the rhombic portions being contiguous with the first pair along one side thereof;
- wherein each of the four rhombic portions is bisected into equilateral triangular regions of equal area, each of the triangular regions having an optical thickness corresponding to a phase level with respect to the design wavelength;
- wherein the phase levels of the triangular regions in the first pair of rhombic portions are $\pi$, $2\pi/3$, 0, and $2\pi/3$ radians, in order along a first direction; and
- wherein the phase levels of the triangular regions in the second pair of rhombic portions are 0, $2\pi/3$, 0, and $5\pi/3$ radians, in order along a second similar parallel direction.

28. The holographic projector system of claim 1 wherein said holographic diffraction grating is defined as:
- a diffraction grating for use at a design wavelength, wherein the grating comprises a repetitive pattern of rhombic unit cells;
- wherein each rhombic cell unit comprises sixteen rhombic portions, a first four of the rhombic portions being in a row adjacent each other along a first side of the unit cell, the remaining rhombic portions forming rows of four, each adjacent and contiguous along a side of each previously formed row thereof;
- wherein each of the sixteen rhombic portions is bisected into equilateral triangular regions of equal area, each of the triangular regions having an optical thickness corresponding to a phase level with respect to the design wavelength;
- wherein the phase levels of the triangular regions in the first row of rhombic portions are 0.0, 0.0, 0.0, 0.0, 0.295167, 0.647584, 0.295167, and 0.0 radians, in order along a first direction;
- wherein the phase levels of the triangular regions in the second row of rhombic portions are 0.0, 0.0, 0.647584, 0.647584, 0.647584, 0.647584, 0.647584, and 0.0 radians, along a second similar parallel direction;
- wherein the phase levels of the triangular regions in the third row of rhombic portions are 0.295167, 0.647584, 0.647584, 0.647584, 0.647584, 0.647584, 0.295167, and 0.295167 radians, along a third similar parallel direction; and
- wherein the phase levels of the triangular regions in the fourth row of rhombic portions are 0.295167, 0.0, 0.647584, 0.0, 0.295167, 0.295167, 0.295167 and 0.295167 radians, along a fourth similar parallel direction.

29. The holographic projector system of claim 1 wherein said holographic diffraction grating is defined as:
- a diffraction grating for use at a design wavelength, wherein the grating comprises a repetitive pattern of square unit cells;
- wherein each square unit cell comprises four square regions of equal area, each of the square regions having an optical thickness corresponding to a phase level with respect to the design wavelength; and
- wherein the phase levels of the square regions are $\pi$, 0, $\pi$, and 0 radians, in order along a rotational direction.

30. The holographic projector system of claim 1 wherein said holographic diffraction grating is defined as:
- a diffraction grating for use at a design wavelength, wherein the grating comprises a repetitive pattern of square unit cells;
- wherein each square unit cell comprises four square regions of equal area, each of the square regions having an optical thickness corresponding to a phase level with respect to the design wavelength; and
- wherein the phase levels of the square regions are $3\pi/2$, 0, $\pi/2$, and $\pi$ radians, in order along a rotational direction.

* * * * *